US006216928B1

(12) United States Patent
Blankenburg et al.

(10) Patent No.: US 6,216,928 B1
(45) Date of Patent: *Apr. 17, 2001

(54) VEHICLE ARTICLE CARRIER WITH MOVABLE CROSS RAIL OPERABLE FROM EITHER SIDE OF VEHICLE

(75) Inventors: Karl Blankenburg, Warren; Karl Van Blankenburg, Washington; Duane Rode, Oakland; Henry Buhlinger, Warren, all of MI (US)

(73) Assignee: The American Team, Mt. Clemens, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/406,967

(22) Filed: Sep. 28, 1999

Related U.S. Application Data

(60) Continuation-in-part of application No. 08/938,050, filed on Sep. 26, 1997, now abandoned, which is a division of application No. 08/650,552, filed on May 20, 1996, now Pat. No. 5,715,980, which is a continuation of application No. 08/347,836, filed on Dec. 1, 1994, now abandoned, which is a continuation of application No. 07/967,991, filed on Oct. 28, 1992, now abandoned.

(51) Int. Cl.$^7$ ........................................................ B60R 9/00
(52) U.S. Cl. ............................ 224/321; 224/322; 224/326
(58) Field of Search .................................... 224/321, 322, 224/325, 326, 309, 329, 330, 337; 410/144, 145, 146, 147, 148, 149

(56) References Cited

U.S. PATENT DOCUMENTS

| D. 314,541 | * | 2/1991 | Bott . |
|---|---|---|---|
| D. 319,810 | * | 9/1991 | Stapleton et al. . |
| 3,554,416 | * | 1/1971 | Bott . |
| 4,294,388 | * | 10/1981 | Wunstel . |
| 4,684,048 | * | 8/1987 | Bott . |
| 4,877,168 | * | 10/1989 | Bott . |
| 4,903,876 | * | 2/1990 | Bott . |
| 4,911,348 | * | 3/1990 | Rasor et al. . |
| 4,972,983 | * | 11/1990 | Bott . |
| 4,982,886 | * | 1/1991 | Cucheran . |
| 4,988,026 | * | 1/1991 | Rasor et al. . |
| 5,082,158 | * | 1/1992 | Bott . |
| 5,104,019 | * | 4/1992 | Bott . |
| 5,133,490 | * | 7/1992 | Cucheran . |
| 5,143,267 | * | 9/1992 | Cucheran et al. . |
| 5,190,198 | * | 3/1993 | Cucheran . |

\* cited by examiner

*Primary Examiner*—Gregory M. Vidovich
*Assistant Examiner*—Maerena W. Brevaro
(74) *Attorney, Agent, or Firm*—Young & Basile, PC

(57) ABSTRACT

A vehicle article carrier having at least one lateral cross rail selectively positionable along longitudinally extending side rails. Stanchions are connected to opposite ends of the cross rail and slidably engage longitudinally formed interior cavities in the side rails. A latch is coupled between each stanchion and each side rail to releasably latch each stanchion and the cross rail in a selected, fixed position along the side rails. An actuator controls the latch. In one embodiment, the actuator is formed by a movable lateral fit between the stanchion and the interior cavity in the side rails permitting lateral movement of each stanchion in each side rail upon push or pull of either stanchion. In another embodiment, the actuator includes a movable operator connected by cables to at least one latch pin carried by a stanchion which is releasably engagable with one of a plurality of spaced apertures formed longitudinally along a side rail.

6 Claims, 12 Drawing Sheets

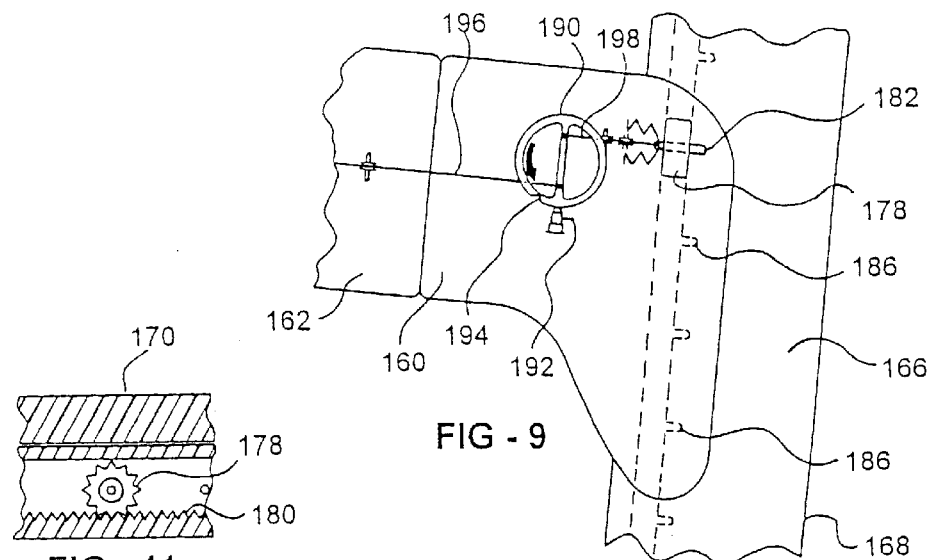
FIG - 9
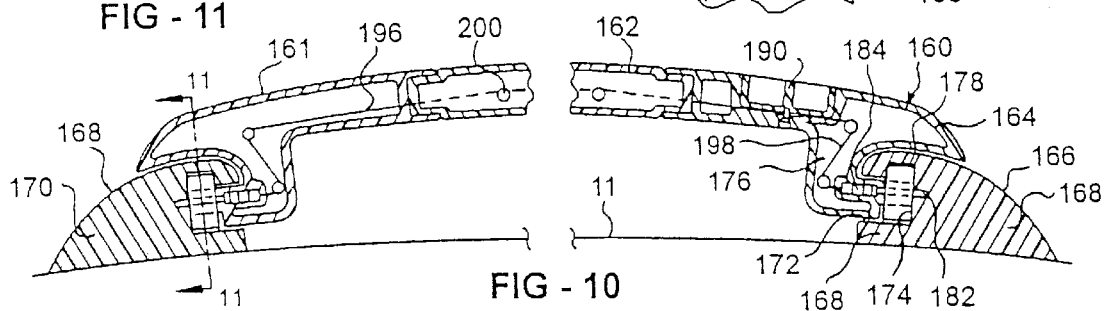
FIG - 11
FIG - 10
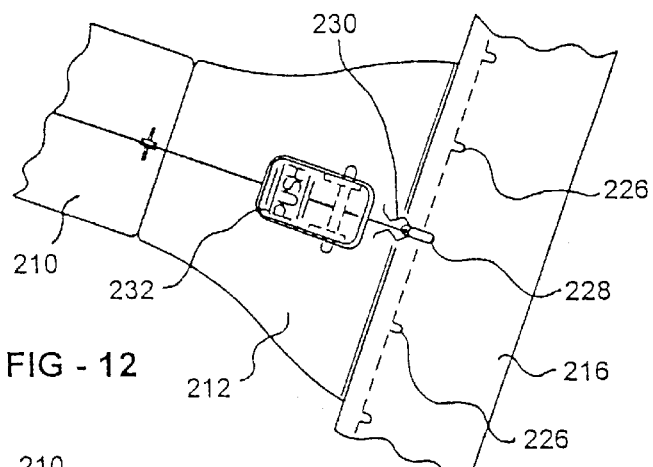
FIG - 12
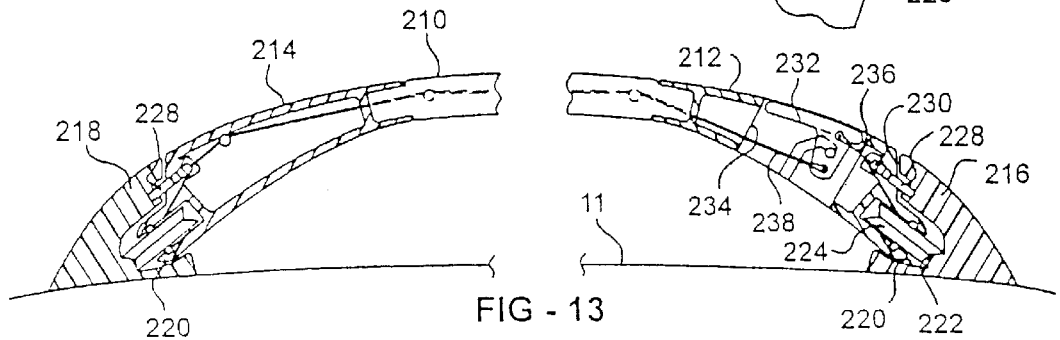
FIG - 13

US 6,216,928 B1

VEHICLE ARTICLE CARRIER WITH MOVABLE CROSS RAIL OPERABLE FROM EITHER SIDE OF VEHICLE

CROSS REFERENCE TO RELATED APPLICATIONS

This application is a continuation-in-part of application Ser. No. 08/938,050, filed on Sep. 26, 1997, now abandoned which is a division of application Ser. No. 08/650,552, filed on May 20, 1996, now issued U.S. Pat. No. 5,715,980; which is a continuation of application Ser. No. 08/347,836 filed on Dec. 1, 1994, now abandoned, which is a continuation of application Ser. No. 07/967,991, filed on Oct. 28, 1992, now abandoned.

BACKGROUND OF THE INVENTION

1. Field of the Invention

The present invention relates to article carriers for vehicles.

2. Description of the Art

A variety of different article or cargo carriers have been devised to transport articles or cargo on the exterior surfaces of vehicles, such as on the roof or trunk of an automotive vehicle. Such carriers typically include a pair of side rails fixed to and extending longitudinally of the vehicle exterior panel. At least a pair of cross rails are connected to and extend laterally between the side rails for supporting a load on the article carrier and to provide convenient tie-down of the load or cargo. Such cross rails are typically supported above the vehicle exterior surface by stanchions mounted on opposite ends of each cross rail which slidably engage the side rails.

In order to facilitate the transport of different sized loads or cargo, slidable and even removable cross rails have been provided in vehicle article carriers. At least one and, frequently, all of the cross rails on a vehicle article carrier are provided with stanchions which slide within a side rail and include a releasable latch which engages the side rail in one of a number of discrete positions or at any variably selected position along the length of the side rail. Such latch mechanisms are mounted in each stanchion and include rotatable knobs, cam levers, clamps and pivotal hooks which releasably engage a side rail.

While the use of stanchions and latch means provides an effective sliding, lockable adjustment of cross rails at selective positions along the length of longitudinally extending side rails, such a structure is not without its drawbacks. As each cross rail includes a pair of stanchions, one mounted at each end and movably engaging opposed side rails, movement of the cross rail requires the release of the latches in each stanchion before the cross rail can be moved along the side rails to the desired position. These unlatch and subsequent re-latch operations require two people, one on each side of the vehicle, or requires a single person to circle between both sides of the vehicle several times to first release the latches and move the cross rail to the desired position and then to re-latch the latches to fix the cross rail in the desired position along the side rails. This is a time consuming task for a single individual and makes adjustment of the cross rail difficult and undesirable. Further, it is difficult for a single person to move a cross rail squarely along the side rail when only exerting force on the cross rail from one side of the vehicle.

Thus, it would be desirable to provide a vehicle article carrier with adjustable cross rail which overcomes the drawbacks of previously devised article carriers having movable cross rails. It would also be desirable to provide a vehicle article carrier with a cross rail which is movable along the length of the side rails from only one side of the vehicle and by only a single operator. It would also be desirable to provide a vehicle article carrier in which a cross rail is movable along the length of the side rails from either side of the vehicle without requiring the operator to move between opposite sides of the vehicle. Finally, it would be desirable to provide a vehicle article carrier with a movable cross rail which insures that the cross rail remains square to the side rails between all longitudinal movement of the cross rail along the side rails even though the operator exerts moving force on the cross rail from only one side of the vehicle.

SUMMARY OF THE INVENTION

The present invention is an article carrier for a vehicle having a generally horizontally extending exterior body surface. The article carrier comprises a pair of spaced side rails mounted on the exterior body surface and extending longitudinally of the vehicle. Each side rail has a longitudinally extending opening formed therein. At least one cross rail extends laterally between the pair of side rails. A pair of stanchions, each extending from opposite ends of the cross rail, slidably engage and are variably positionable along the longitudinal opening in the side rails. Latch means are formed on each stanchion and each side rail for selectively and adjustably latching the stanchions to the side rails in one of a plurality of selected positions along the length of the side rails. Actuator means are coupled to the latch means and associated with each stanchion and are operable from a position adjacent to one side of the vehicle for simultaneously moving each latch means between a latch position in which the latch means fixedly engages the associated side rail and an unlatch position in which the latch means is disengaged from the side rail permitting longitudinal movement of the cross rail along the side rails.

In one embodiment adapted for push/pull release and engagement of the latch means with the side rails, the latch means comprises a plurality of longitudinally spaced apertures formed in at least one of the side rails. A pin or tab is mounted in and extends outward from at least one of the stanchions to releasably engage one of the apertures in the side rail. The actuator means moves the pin or tab into and out of engagement with one of the apertures in the side rail.

In this embodiment, a slider means is mounted on each stanchion for slidably engaging the longitudinal opening in each stanchion. An opening is formed in each side rail which has a cross section larger than the cross section of the slider means to permit selective lateral movement of the slider means within the opening in the side rail. Biasing means are mounted between each stanchion and the associated side rail for biasing each stanchion and the cross rail extending therebetween toward a first normal lateral direction with respect to the side rails bringing the pin into engagement with one of the apertures in the side rail and, yet, allows the cross rail and the stanchions to be manually urged in an opposite direction, overcoming the force of the biasing means, to disengage the pin from the aperture in the side rail and permitting longitudinal movement of the cross rail along the side rails. The slider includes at least one roller mounted about the end of a stanchion which rollably engages the side rail in the opening in the side rail. The pin and the biasing means are mounted in the end of the stanchion and extend outward from the roller.

In alternate embodiments, the roller is oriented in a substantially horizontally extending position and is connected to the end of the stanchion by a vertically extending leg extending through an opening in the top surface of the side rail or through a leg extending inward and upward through an opening formed in a bottom, inward edge of each side rail.

In another main embodiment of the present article carrier, a roller is mounted on the end of each stanchion and rollably engages a complimentarily formed groove in the opening in each side rail. Biasing means, mounted in each stanchion, normally biases a pin outward from each stanchion into one of a plurality of discrete linearly spaced apertures formed in each side rail. The actuator means comprises a movable operator mounted in one of the stanchions and cable means extending from the operator to the pin. Preferably, a pin is mounted in each stanchion on opposite ends of a cross rail and connected by cables to the single operator. The operator is movable from a first position in which the operator positions the cables such that pins connected thereto extend outward under the force of the biasing means into an aperture in each side rail to a second position in which the cables retract the pins from the apertures in the side rails permitting longitudinal movement of the cross rail with respect to the side rails. In one embodiment, the operator comprises a knob rotatably mounted in one stanchion. In another embodiment, the operator comprises a pivotal lever mounted in one stanchion.

In another embodiment, an operator is depressibly mounted in each stanchion. A single cable extends between the pins mounted on each stanchion and is acted on by one operator to permit simultaneous disengagement of both pins from the side rails from either side of the vehicle. In this embodiment, the opening in the side rail extends upward through the top surface of the side rail, with the stanchions movably disposed through the opening. Release of the pins from the apertures in the side rails permits an upward movement of one end of the cross rail disengaging the associated stanchion from the side rail through the opening in the side rail prior to movement of the cross rail longitudinally along the side rails. Alternately, the entire cross rail can be removed from the side rails.

In yet another embodiment, adapted for push/pull release and re-engagement of the cross rail with the side rails, a toothed rack is mounted in the bottom of the opening in the side rail and engaged by a toothed ball mounted in a carrier attached to each stanchion. In this embodiment, the latch means includes a first toothed latch rack mounted in the opening of each side rail and facing the same lateral direction. A spherical ball is mounted in each stanchion and is connected to the carrier carrying the toothed ball by a resilient arm. The actuator means comprises the ball carrier having a cross section less than the width of the opening in the side rail. A second toothed latch rack is mounted on the ball carrier and releasably engages the first toothed latch rack. The resilient arms bias the stanchions and the interconnected cross rail in a first position toward one lateral side of the vehicle in which the first and second toothed latch racks are engaged to stationarily fix the cross rail in a selected longitudinal position along the side rails. Manual force exerted on one of the stanchions toward the other side of the vehicle disengages the first and second toothed latch racks from each other and, by a pivoting of the opposed resilient arm disengages the toothed latch racks on the opposite side of the vehicle by lateral movement of the associated carriers within the openings in the side rail. This permits longitudinal movement of the stanchions and the cross rail along the side rails.

In a final embodiment, a carrier is connected to each stanchion and has at least one roller mounted therein rollably engaging the interior of a side rail bounding the opening therein. The latch means includes a toothed rack facing inward to the longitudinal opening in each side rail. A rotatable gear is mounted in each carrier and threadingly engages the toothed rack in the side rail. The actuator means comprises a handle connected to at least one of the gears for rotating the gear and longitudinally moving the stanchions and the cross bar along the side rail to any desired position. Preferably, a toothed rack is mounted on each side rail and engaged by an individual gear rotatably mounted on each stanchion on opposite ends of a cross rail. In this embodiment, a recess is optionally formed in the top surface of the stanchion. The handle is pivotally mounted to the rotatable gear and is pivotal from an outward, operative position for rotating the gear and an inward, storage position in which the handle is disposed in the recess below the top surface of the stanchion.

The article carrier of the present invention provides adjustable movement of a cross rail between many different selected positions along longitudinally extending side rails in which the cross rail is releasably latchable to the side rails in each selected position and releasable for movement therealong from one or either side of the vehicle. The present article carrier simplifies the longitudinal positioning of the cross rail along the side rails since only a single person, and not two as required in previously devised vehicle article carriers, is needed to unlatch, move and re-latch the cross rail in a desired position along the side rails. Further, a single person can operate the latches to adjust the position of the cross rail from either single side of the vehicle. This eliminates the need for two people to adjust the position of a cross rail along the side rails or the necessity of a single person circling the vehicle several times to unlatch, move and then re-latch the cross rail in a desired position. The vehicle article carrier of the present invention also insures that the cross rail remains perpendicular to the side rails during all movement of the cross rail along the side rails.

BRIEF DESCRIPTION OF THE DRAWING

The various features, advantages and other uses of the present invention will become more apparent by referring to the following detailed description and drawing in which:

FIG. 9 is a partial, plan view showing an article carrier according to a fifth embodiment of the present invention;

FIG. 10 is a lateral, partially cross sectioned view of the fifth embodiment shown in FIG. 9;

FIG. 11 is a cross sectional view taken along line 11—11 in FIG. 10;

FIG. 12 is a partial, plan view of a sixth embodiment of the present invention;

FIG. 13 is a lateral cross sectional view of the sixth embodiment shown in FIG. 12;

DESCRIPTION OF THE PREFERRED EMBODIMENTS

Figure 1:
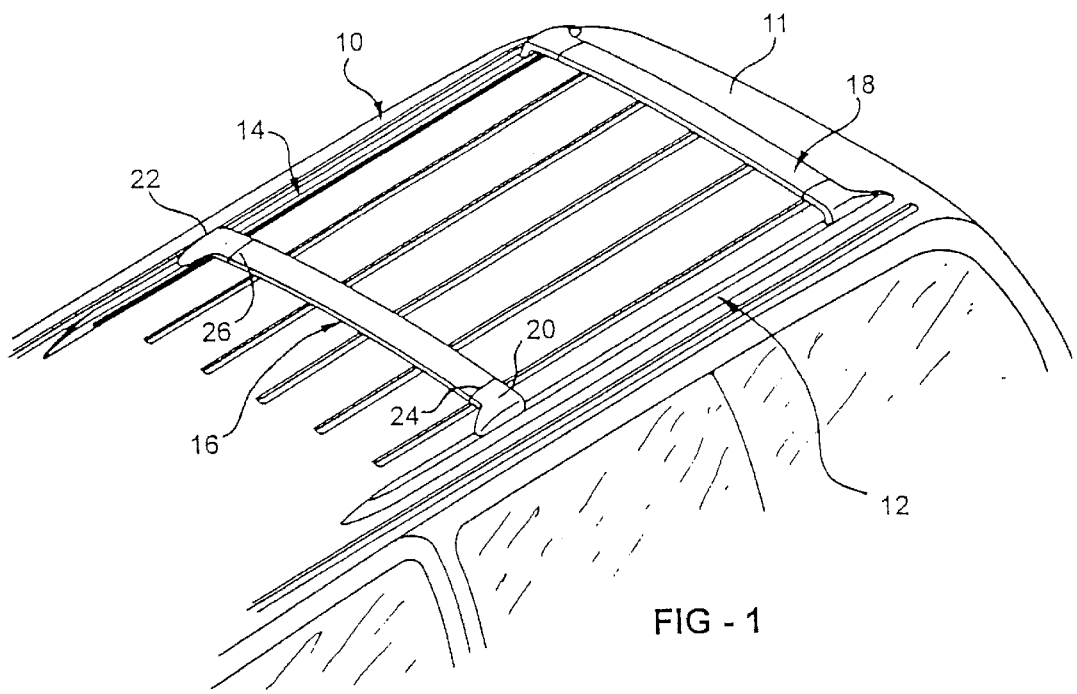
FIG. 1 is a perspective view of an article carrier constructed in accordance with a first embodiment of the present invention.

Referring now to the drawing there are illustrated various embodiments of an article carrier which are adapted for carrying articles or cargo on an exterior body panel of a vehicle.

As shown in FIG. 1, the article carrier 10 of the present invention is mounted on a substantially horizontally extending vehicle exterior surface panel 11, such as a roof panel, of a vehicle. Alternately, the article carrier 10 could be mounted on a trunk of an automobile. Such panels are substantially horizontal in orientation and generally planar in shape, except that such body panels may have a slight bow from a longitudinal center line to the outer side edges thereof.

In general, the article carrier 10 includes a pair of side rails denoted generally by reference numbers 12 and 14 which are laterally spaced on the exterior body panel 11 and extend longitudinally along the length of the exterior body panel 11. The side rails 12 and 14, which are substantially identical, although typically formed as mirror images of each other, may be formed of any suitable material for carrying articles, such as metal, plastic and combinations thereof. The side rails 12 and 14 are fixed to the vehicle exterior panel 12 by suitable means, such as fasteners, adhesive, etc., not shown. Further, the side rails 12 and 14 may have any suitable shape, the shapes described herein being examples only. Such shapes may provide aerodynamic qualities as well as serving an aesthetic purpose.

The article carrier 10 includes at least two cross rails 16 and 18, at least one of which is movable longitudinally along the side rails 12 and 14. As shown in the embodiment depicted in FIG. 1, the cross rail 16 is movable longitudinally along the side rails 12 and 14; while the cross rail 18 is stationarily mounted to one end of the side rails 12 and 14. It will be understood that any number of cross rails, as well as having all of the cross rails, such as cross rail 18, movably mounted on the side rails 12 and 14 is also within the scope of the present invention.

The cross rails, such as cross rails 16 and 18, extend laterally between the side rails 12 and 14. The cross rails 16 and 18 are formed with any exterior shape, such as, for example, a shape providing aerodynamic and aesthetic qualities. Further, the cross rails 16 and 18 may be formed of any suitable metal, plastic, or combinations thereof, and may be hollow or solid, as desired.

Figure 3:
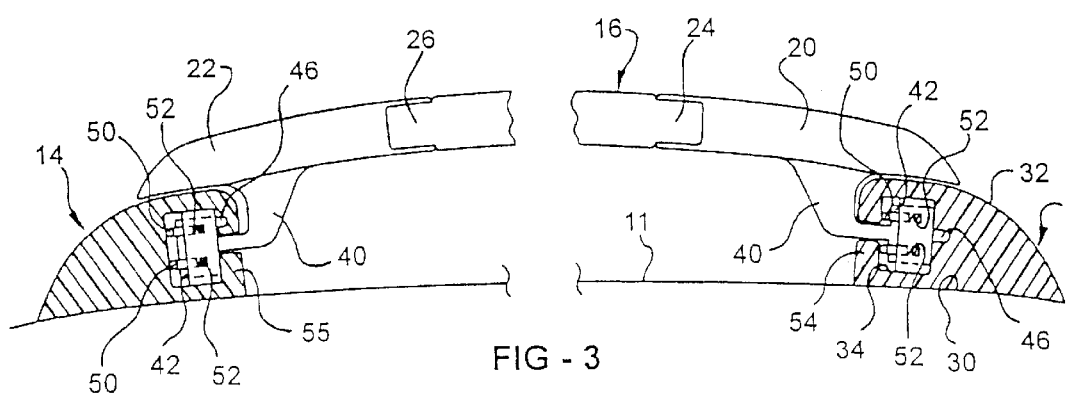
FIG. 3 is a lateral, partially cross sectioned view of the first embodiment shown in FIG. 1.

Each of the cross rails, such as cross rail 16, has a pair of stanchions 20 and 22 extending outward from first and second ends 24 and 26, respectively, thereof. Each of the stanchions 20 and 22 may be formed of a separate member, as shown in FIG. 3, which is attached to an end of the cross rail 16; or the stanchions 20 and 22 may be formed as an integral, continuous one-piece extension of the cross rail 16. The stanchions 20 and 22 serve to slidably mount and/or slidably connect the cross rail 16 to the side rails 12 and 14 as well as to support the cross rail 16 above the vehicle exterior surface 12.

Figure 2:
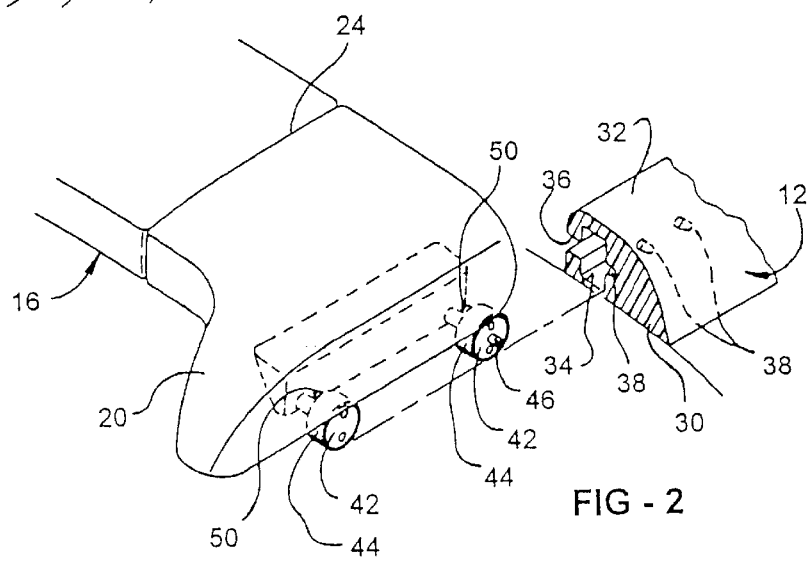
FIG. 2 is an exploded, partial, cross sectional, perspective view showing the connection between the cross rail and the side rail of the first embodiment shown in FIG. 1.

In a specific embodiment shown in FIGS. 2 and 3, each of the side rails 12 and 14, such as side rail 12, has a lower surface 30 disposed in registry with the surface of the vehicle exterior body panel 11. The exterior surface 32 of the side rail 12 curves upward and inward in an aerodynamic and aesthetic shape from the lower surface 30. A longitudinally extending slot 34 of a predetermined cross sectional shape is formed in and extends along the length of each of the side rails 12 and 14, such as the side rail 12. An outwardly extending opening 36 is formed in the side rail 12 and communicates with the slot 34. In this embodiment, a plurality of apertures, such as cylindrical bores 38, are formed in the side rail 12 and communicate with the slot 34.

Each of the stanchions 20 and 22, in this embodiment, are designed as separate members which are connected to the first and second ends 24 and 26, respectively, of the cross rail 16 by means of an interfitting tongue and groove connection, as shown in FIG. 3. Suitable fasteners, adhesives, etc., not shown, may be employed to fixedly interconnect the stanchions 20 and 22 to the opposite ends of the cross rail 16.

Each of the stanchions 20 and 22 includes a depending leg 40 which extends downward and laterally outward from the main body of each stanchion 20 and 22. Each depending leg 40 terminates in an end member 42 which is adapted to be disposed within the slot 34 in one of the side rails 12 or 14. By way of example only, and not limitation, two end members 42 are mounted on the depending leg 40 and spaced apart, as shown in FIG. 2. A roller 44 is mounted on each end member 42 and rollably engages the interior side walls of the slot 34 in the side rail 12 or 14.

A latch pin 46 is mounted on one of the end members 42 and extends laterally outward therefrom. The latch pin 42 is adapted to engage one of the bores 38 in the side rail 12 to fixedly position the stanchion 20 and the cross rail 16 in a fixed position relative to the side rail 12. It will be understood that the opposed end member also has a corresponding latch pin which fits within a similar aperture or bore formed in the side rail 14 to fixedly position the opposite end of the cross rail 16 to the opposed side rail 14. A biasing means is mounted in each end member 42 and includes at least one and preferably a pair of outwardly extending pins 50 which are movably disposed in bores formed in the end member 42. A biasing spring 52 is mounted in each bore and normally biases the pins 50 outward into contact with an adjacent side wall 54 of the slot 34 in the side rail 12. This force exerted by the biasing springs 52 urges the end member 42 away from the inner side wall 54 of the side rail 12 and toward the outer lateral edge of the side rail 12 thereby normally forcing the latch pin 46 into engagement with one of the spaced bores 38 in the side rail 12.

The opposite stanchion 22 and side rail 14 are similarly constructed except that the spaced bores 38 in the side rail 14 are formed on an inner side wall 55 bounding the longitudinally extending slot in the side rail 14. The biasing springs 52 bias the pins 50 outward thereby urging the end member 42 attached to the depending leg 40 of the stanchion 22 toward the inner side wall 55 of the side rail 14 in the same direction as the opposed end member 42 is urged by its biasing springs 52. The latch pin 46 on the end member 42 extends inward from the end member 42 into engagement with one of the bores 38 formed in the side rail 14.

In operation, the biasing means or springs 52 exert a normal force on their associated pins 50 thereby urging the associated end members 42 to the right in the orientation shown in FIG. 3 bringing the respective latch pins 46 into engagement with one of the bores 38 in the respective side rails 12 and 14. This retains the cross rail 16 in a fixed position relative to the side rails 12 and 14 at a selected position along the length of the side rails 12 and 14. However, when it is desired to reposition the cross rail 16 to a different longitudinal position along the length of the side rails 12 and 14, a single user need only exert a push force on the stanchion 20 or a pull force on the stanchion 22 sufficient to overcome the force of the biasing springs 52 so as to urge the end members 42 on each stanchion 20 and 22 to the left, in the orientation shown in FIG. 3, thereby disengaging the latch pins 46 from the respective bores 38 in the side rails 12 and 14. While the cross rail 16 is thus maintained in the leftmost position by the user, the user may then longitudinally reposition the cross rail 16 in either fore or aft directions along the side rails 12 and 14 until the desired new position is reached. The user then releases the stanchion at which time the biasing springs 52 will urge the respective end members 42 to the right bringing the latch pins 46 into engagement with different aligned bores 38 in the side rails 12 and 14. It will be understood that a small amount of lateral movement may be necessary to bring each of the latch pins 46 into secure engagement with a bore 38 in the side rails 12 and 14. The space in between the bores 38 in the side rails 12 and 14 may be provided as desired, such as a ¼ inch spacing between successive bores 38.

Figure 4:
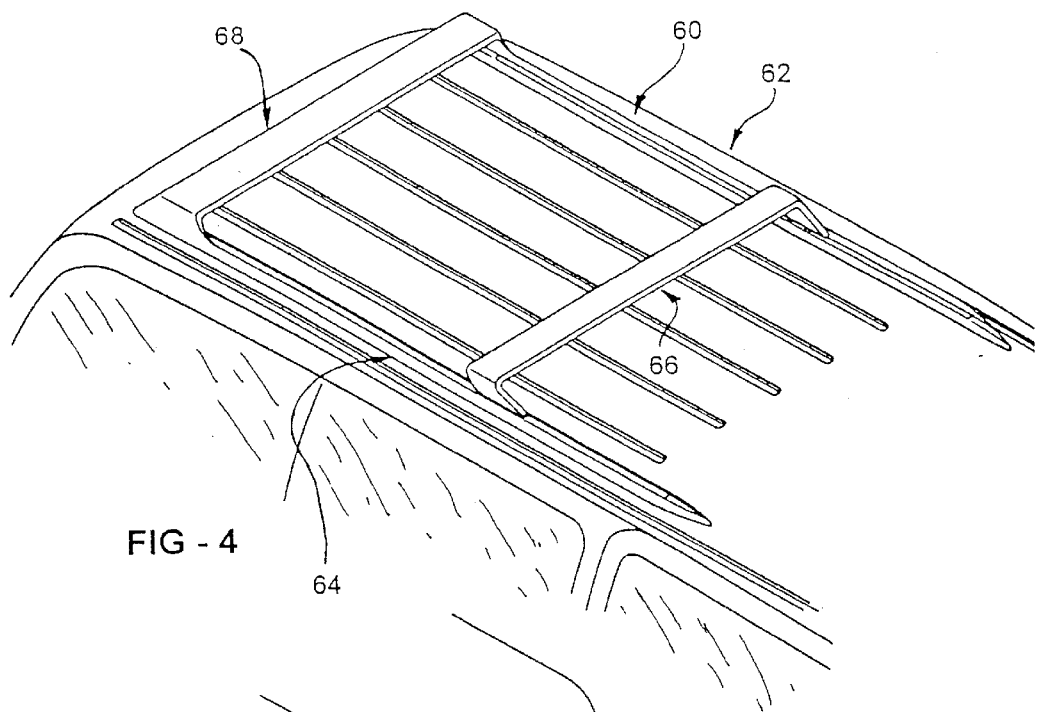
FIG. 4. is a perspective view of a second embodiment of an article carrier according to the present invention.
Figure 5:
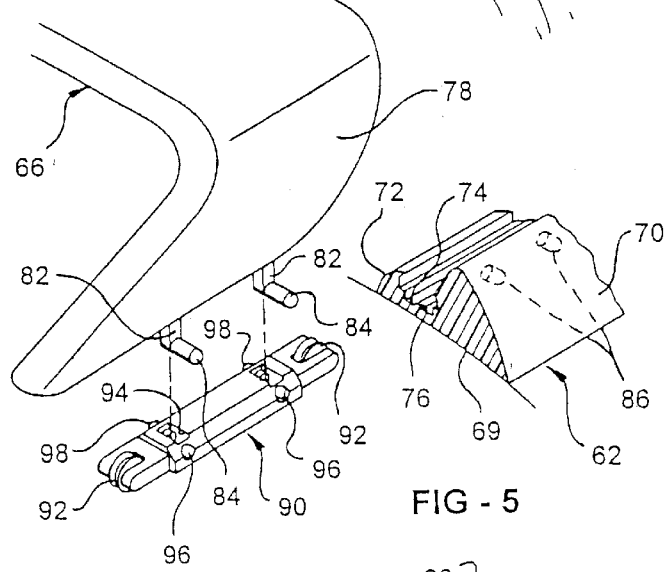
FIG. 5 is an exploded, partial, cross sectional, perspective view of the second embodiment shown in FIG. 4.
Figure 6:
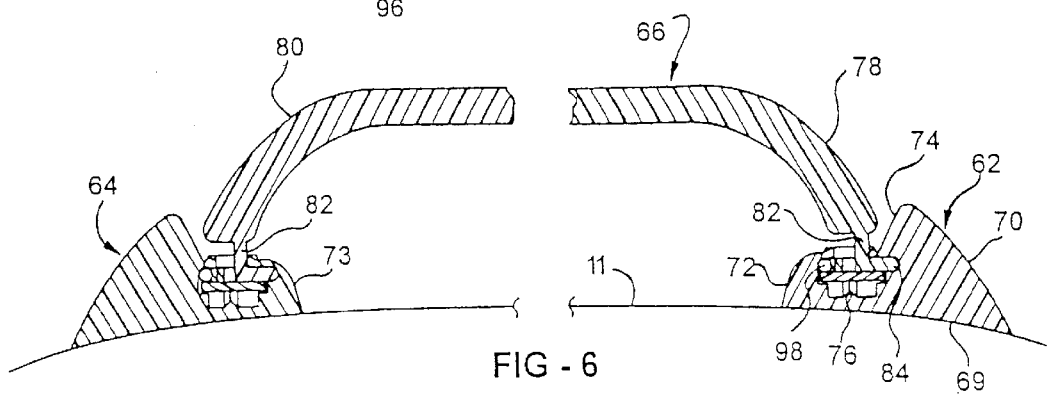
FIG. 6 is a lateral, cross sectional view of the second embodiment shown in FIGS. 4 and 5.

Turning now to FIGS. 4, 5 and 6, there is depicted another embodiment of an article carrier according to the present invention. In this embodiment, the article carrier 60 includes first and second side rails 62 and 64, respectively, which are laterally spaced apart and extend longitudinally along a vehicle exterior surface, such as the exterior body panel 11 shown in FIG. 1. A first cross bar 66 is movably mounted on and extends laterally across the side rails 62 and 64. A second cross bar 68 also extends laterally across the side rails 62 and 64; but is stationarily fixed to one end of the side rails 62 and 64. It will be noted in FIG. 4 that the cross bars 66 and 68 have an aerodynamic shape. Further, the first cross bar 66 may be moved completely into proximity with the second cross bar 68 in a nested arrangement such that both cross bars 66 and 68 form a smooth, continuous, aerodynamic exterior top surface thereacross.

As shown in FIGS. 5 and 6, each of the side rails 62 and 64 has an identical shape. By example only, the side rail 62 includes a bottom surface 69 mounted on a vehicle exterior panel 11, an outer side surface 70 which extends upward from the bottom surface 69, an inner side edge 72 and a centrally located cavity 74 which opens through the top surface of the side rail 62. An upstanding, longitudinally extending projection 76 is formed in the cavity 74, the purpose of which will become more apparent hereafter.

In the embodiment shown in FIGS. 4–6, the stanchions form continuous, one-piece extensions of the cross rail 66. Thus, the stanchions are indicated by stanchion portions 78 and 80 formed on opposite ends of the cross rail 66.

At least one and preferably a pair of legs 82 depend downward from each stanchion 78 and 80 and terminate in outwardly extending pins 84 which are oriented substantially perpendicular to the depending legs 82. The pins 84 are adapted to engage one of a plurality of spaced bores 86 formed in the side rails 62 and 64.

A carrier 90 is provided for carrying at least one and preferably a pair of spaced rollers 92 which rollably engage the interior walls of each side rail 62 and 64 bounding the cavity 74 and the projection 76 in each side rail 62 and 64 to control the sliding movement of the cross rail 66 along the side rails 62 and 64. A recess 94 is formed in the carrier 90 for each depending leg 82 and pin 84, respectively, with the outer end of the pin 84 extending through a bore 96 formed in the carrier 90 and communicating with the recess 94. Biasing means 98 in the form of a coil spring is mounted in the recess 94 for normally biasing the pin 84 and the attached stanchion portion 78 laterally outward so as to bring the pins 84 into engagement with one of the bores 86 in the side rail 62. However, the length of the recess 94 in the carrier 90 is somewhat larger than the length of the pin 84 and thickness of the depending leg 82 so as to movably dispose the leg 82 and pin 84 in the recess 94. This enables the pin 84 and leg 82 as well as the stanchion 78 attached thereto to be moved laterally inward a small amount, such as ¼ inch, within the cavity 74 in the side rail 62. A similar carrier 90, pins 84 and biasing means 98 are associated with the opposite stanchion portion 80 such that the stanchion portion 80 is likewise able to exhibit a small amount of lateral movement within the associated side rail 64. However, the pins 84 associated with the stanchion 80 extend toward the inner side wall 73 of the side rail 64 such that the cross rail 66 and integral stanchion portions 78 and 80 move laterally together as a unit.

As with the first embodiment shown in FIGS. 1–3, a single user can exert a push force on the stanchion portion 78 or a pull force on the stanchion portion 80 to cause the entire cross rail 66 and both stanchion portions 78 and 80 to move laterally within the respective side rails 62 and 64 thereby releasing the pins 84 from the respective bores 86 in the side rails 62 and 64 and permitting longitudinal adjustment of the cross rail 66 along the length of the side rails 62 and 64. Release of the push or pull force will cause the biasing springs 98 to urge the pins 84 as well as the entire cross rail 66 in the opposite lateral direction until the pins 84 seat within a different bore 86 in the side rails 62 and 64 thereby locking the cross rail 66 in the desired longitudinal position along the side rails 62 and 64.

Figure 7:
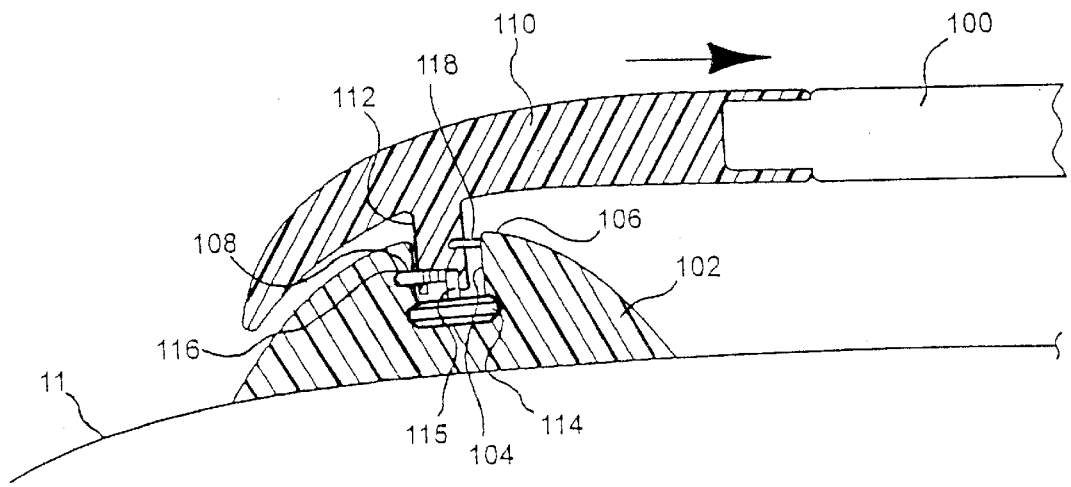
FIG. 7 is a partial, lateral, cross sectional view showing the mounting of a cross rail to a side rail in a third embodiment of the present invention.

FIG. 7 depicts a slightly different arrangement for releasably positioning a cross rail 100 longitudinally along a pair of spaced side rails, only one of which is shown in FIG. 7 by reference number 102. The side rail 102 includes an internal slot 104 which opens through the top surface 106 of the side rail 102. A plurality of longitudinally spaced bores 108, only one of which is shown in FIG. 7, are spaced longitudinally along the side rail 102. A stanchion 110 is mounted at one end of the cross rail 100 and has a leg 112 depending therefrom. A roller 114 is rollably mounted on the end of the depending leg 112 by means of an axle movably disposed in a slot in the leg 112. The roller 114 engages a complimentarily shaped groove formed at a bottom portion of the internal slot 104 in the side rail 102 for controlling the sliding movement of the cross rail 100 along the side rail 102. A latch pin 116 extends outward from the leg 112 and releasably engages one of a plurality of spaced bores 108 from in the side rail 102. A spring biased pin 118 is mounted on the opposite leg 112 and is biased into normal engagement with a side wall of the slot 104 in the side rail 102.

As shown in FIG. 7, the width of the internal slot 104 in the side rail 102 is slightly larger than the width of the depending leg 112. This permits the depending leg 112 as well as the stanchion 110 and the cross rail 100 attached thereto to be moved laterally inward under a manual push force overcoming the force of the biased pin 118, in the direction of the arrow a small amount sufficient to disengage the pin 116 from the bore 108 in the side rail 102. This enables longitudinal movement of the cross rail 100 along the side rail 102. This lateral movement is accomplished by a push force on the stanchion 110 or results from a pull force exerted on the stanchion attached to the opposite end of the cross rail 100, not shown. Release of this force enables the biased pin 118 to urge leg 112 and the latch pin 116 outward until the latch pin 116 engages one of the bores 108 in the side rail 102 thereby locking the cross rail 100 in a fixed position relative to the pair of side rails.

Figure 8:
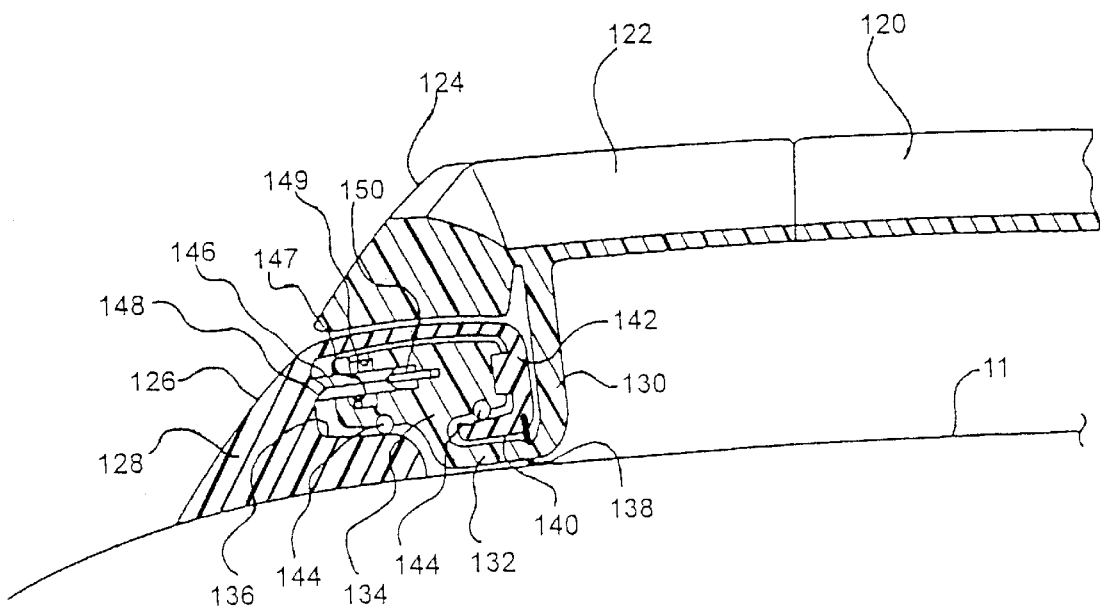
FIG. 8 is a partial, lateral, cross sectional view showing the mounting of a cross rail to a side rail in a fourth embodiment of the present invention.

FIG. 8 depicts another arrangement of a side rail and stanchion in which the roller and latch means are sealingly mounted within a side rail 128. In FIG. 8, a cross rail 120 has a pair of stanchions mounted at opposite ends, only one stanchion 122 being shown. The stanchion 122 has an outer edge 124 which forms a smooth, continuous, tapered surface in conjunction with an outer surface 126 of the side rail 128. A leg 130 depends downward from the stanchion 122 and laterally outward in an intermediate leg portion 132 before terminating in an enlarged end portion 134 disposed completely within a cavity 136 formed in and extending longitudinally along the side rail 128. A seal 138 may be mounted at the junction of an opening 140 formed between the bottommost portion of an inner surface 142 of the side rail 128 which is spaced from the adjacent vehicle panel 11 to seal the interior cavity 136 from the environment. Ball bearings 144 may optionally be disposed between interior surfaces of the side rail 128 bounding the cavity 136 and the enlarged end section 134 of the leg of the stanchion 122. At least one roller 146 is rollably mounted on the enlarged end portion 134 by an axle 147. The axle 147 and the roller 146 are disposed in an enlarged slot or cavity 136 in the end portion 130 and are capable of a small lateral movement therein. The roller 146 includes a peripheral groove which engages a projection 148 formed in the side rail and extending inward into the interior cavity 136 in the side rail 128. A spring-biased pin 150 is mounted on the enlarged end portion 134 and seats against a sidewall of the cavity 136 to bias the end portion 134, the stanchion 122 and the cross rail 120 to the right while enabling a lateral force, as described above, to be exerted on either of the stanchions attached to the cross rail 120 and cause lateral movement of the cross rail 120 and the stanchions 122. This lateral movement disengage a latch pin on the opposite stanchion from one of a plurality of bores in the opposite side rail, in the same manner as described above and shown in FIG. 7.

Another embodiment of an article carrier constructed in accordance with the teachings of the present invention is shown in FIGS. 9–11. In this embodiment, a pair of stanchions 160 and 161 are connected to opposite ends of a cross rail 162. Each of the stanchions 160 and 161 includes a smoothly curved outer surface 164 which forms an extension of a smoothly curved outer surface 166 of an associated side rail 168 or 170. Each of the side rails has a longitudinally extending slot 172 formed on an inner side wall which opens to an interior cavity denoted by reference number 174.

As shown in FIG. 10, each of the stanchions, such as stanchion 160, has a depending leg 176 formed thereon which extends downward from the main body of the stanchion 160 before extending laterally outward through the slot 172 in the side rail 168. A toothed gear 178 is mounted on an end portion of the depending leg 176 and rollably engages the interior cavity 174 in the side rail 168. The gear 178 engages a toothed rack 180 mounted on the bottom surface of the interior cavity 174 in either of the side rails 168 or 170.

An actuator means is mounted in one of the stanchions, such as stanchion 160, for simultaneously engaging and disengaging the latch pins 182 mounted in each of the stanchions 160 and 161 from the respective apertures in the side rails 168 and 170. The actuator means, in this embodiment, includes a rotatable knob 190 mounted in the stanchion 160 and accessible through the top surface thereof. A spring-biased pin 192 is mounted in the stanchion 160 and engages a detent 194 formed in the peripheral surface of the knob 190 for limiting rotatable movement thereof within predetermined limits. Cable means in the form of cables 196 and 198 are connected to the knob 190 and, respectively, to the pins 182 in the stanchions 160 and 161. The cables 196 and 198 pass over guide rollers 200 mounted within the cross rail 162 and the stanchions 160 and 161, as shown in FIG. 10.

In operation, with the rotary knob 190 in the position shown in FIGS. 9 and 10, biasing springs 184 will bias the respective latch pins 182 outward into one of the bores 186 in the side rails 168 and 170 thereby locking the cross bar 162 in a fixed longitudinal position along the side rails 168 and 170. In this position, the rotary knob 190 exerts little or no pressure on the cables 196 and 198. However, rotation of the knob 190 in the counterclockwise direction shown by the arrow in FIG. 9 until the spring pin 192 engages the detent 194 in the knob 190 will cause a pulling force to be exerted on each of the cables 196 and 198 which will retract the pins 182 from the apertures 186 in the respective side rails 168 and 180 thereby allowing longitudinal movement of the cross rail 162 with respect to the side rails 168 and 170. The engagement between the gear tooth 178 and the rack 180 in each of the side rails 168 and 170 ensures that the cross rail 162 remains substantially perpendicular to the side rails 168 and 170 during such longitudinal movement.

FIGS. 12 and 13 depict another embodiment of the article carrier of the present invention which utilizes a slightly different actuator means. In this embodiment, a cross rail 210 is connected at opposite ends to a pair of stanchions 212 and 214. The top surface of the stanchions 212 and 214 and the top surface of the cross rail 210 form a smooth, arcuate surface which merges in a flush or smooth manner with the exterior, top surfaces of a pair of side rails 216 and 218 which are mounted on an exterior vehicle panel 11. Each of the side rails 216 and 218 has an open-ended recess 220 formed therein which has an outwardly extending projection 222 formed therein. The projection 222 engages a groove formed in a roller 224 rotatably mounted on an outer end of each of the stanchions 212 and 214 to guide the sliding movement of the cross rail 210 along the side rails 216 and 218. A plurality of longitudinally spaced bores 226 are formed in each of the side rails 216 and 218 and slidably receive a latch pin 228 which is normally biased outward from an end of the stanchions 212 or 214 by a biasing spring 230 seated within each stanchion 212 or 214.

An actuating means, in this embodiment, is in the form of a pivotal push button or lever 232 which is mounted in a recess 234 in one of the stanchions, such as stanchion 212. The lever 232 is pivotally mounted in the stanchion 212 and is movable from a first, normal position substantially flush with the top surface of the stanchion 212 to a depressed position under manual force. Cable means in the form of a pair of cables 236 and 238 are connected to the lever 232 and respectively extend to the latch pins 228 in the stanchions 212 and 214. Depression of the push button or lever 232 causes a force to be exerted on the cables 236 and 238 which retracts the latch pins 228 from the bores 226 in the side rails 216 and 218 thereby enabling sliding movement of the cross rail 210 along the side rails 216 and 218 via the rollers 224 rollably engaging the side rails 216 and 218.

Figure 14:
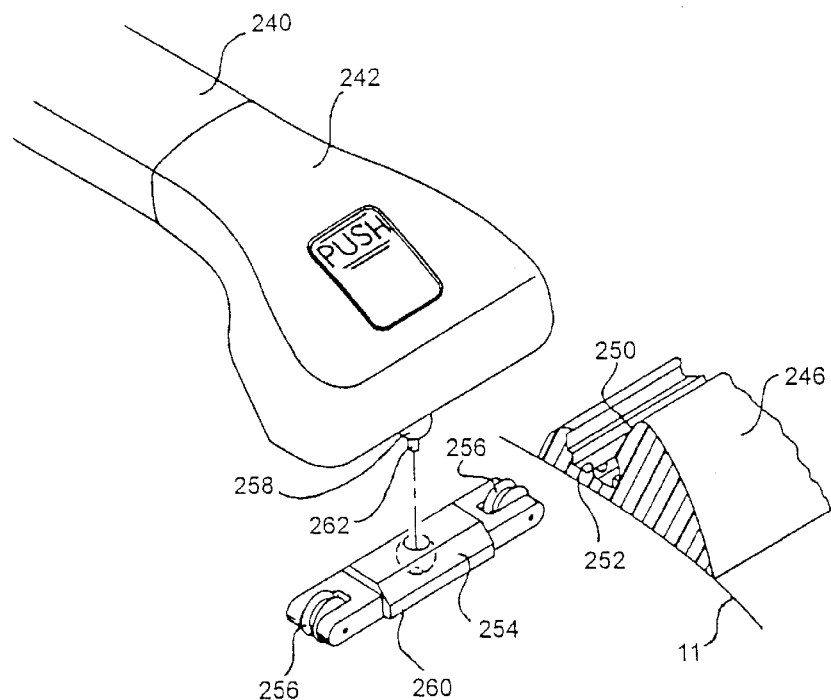
FIG. 14 is a partial, exploded, cross sectional, perspective view of a seventh embodiment of the present invention.
Figure 15:
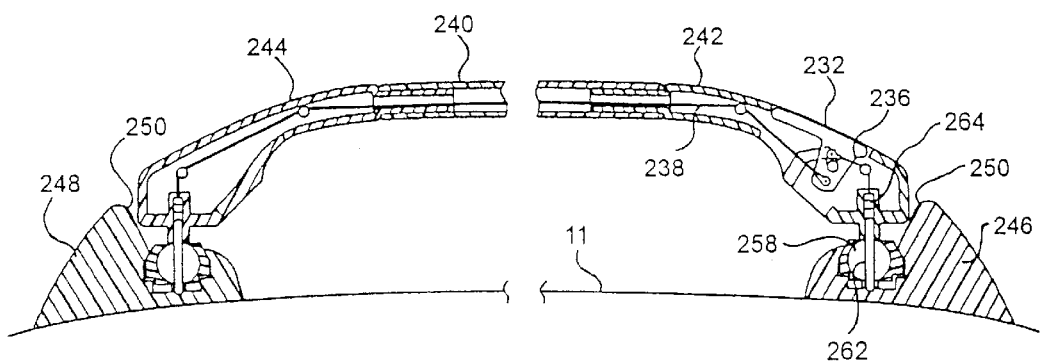
FIG. 15 is a lateral cross sectional view of the seventh embodiment shown in FIG. 14.

In another embodiment shown in FIGS. 14 and 15, a cross rail 240 is connected at opposite ends to a pair of stanchions 242 and 244. The stanchions 242 and 244 are rollably mounted in a pair of spaced side rails 246 and 248. Each of the side rails 246 and 248 has an internal slot 250 opening through a top surface thereof with an outwardly extending projection 252 formed in a bottom surface thereof. A carrier 254 having a pair of spaced rollers 256 mounted at opposite ends thereof is pivotally connected to each stanchion, such as stanchion 242, by a universal-type connection comprising a spherical ball 258 carried by the stanchion 242 which is mounted within a spherical recess 260 formed in the carrier 254. A latch pin 262 extends through the spherical ball 258 and the recess 260 in the carrier 254 for releasable engagement with a plurality of spaced bores, not shown, formed along the length of the bottom surface of the slot 250 in the side rail 246. A biasing spring 264 is mounted in the stanchion 242 and seats on the latch pin 262 to normally bias the latch pin 262 outward from the end of the stanchion 242 into engagement with one of the bores in the side rail 246.

An actuator, such as either of the actuators 190 or 232 described above and shown in FIGS. 9 and 12, respectively, may be employed for controlling the position of the latch pins 262. By way of example only, the actuator 232 in the form of a pivotal lever or push button is mounted in the stanchion 242. Cables 236 and 238 extend from the lever 232 to the latch pins 262 mounted in the stanchions 242 and 244, respectively. The actuator 232 functions in the same manner as that described above in the embodiment shown in FIGS. 12 and 13 to control the engagement and disengagement of the latch pins 262 with the bores in the side rails 246 and 248.

Figure 16:
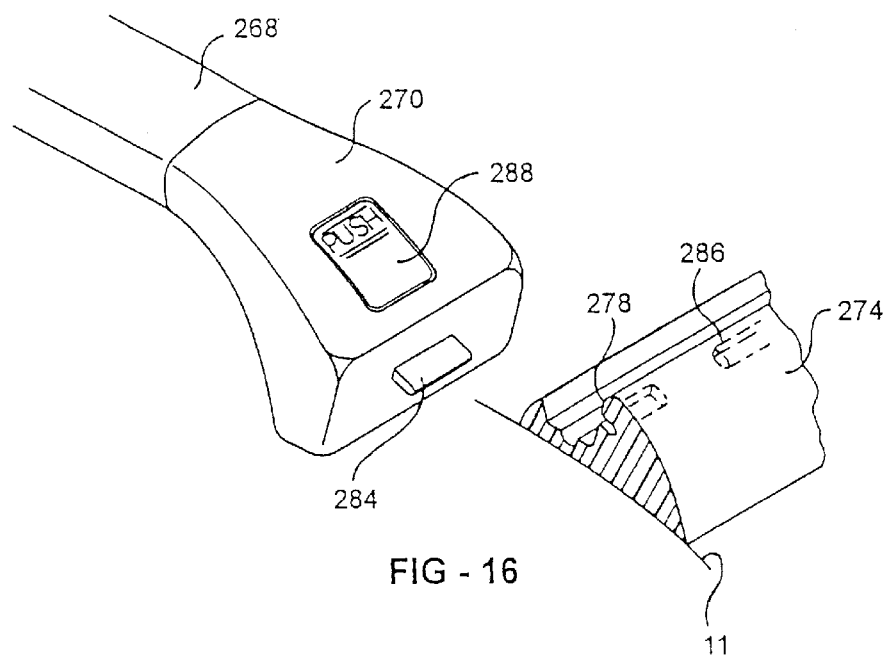
FIG. 16 is a partial, exploded, cross sectional, perspective view of an eighth embodiment of the present invention.
Figure 17:
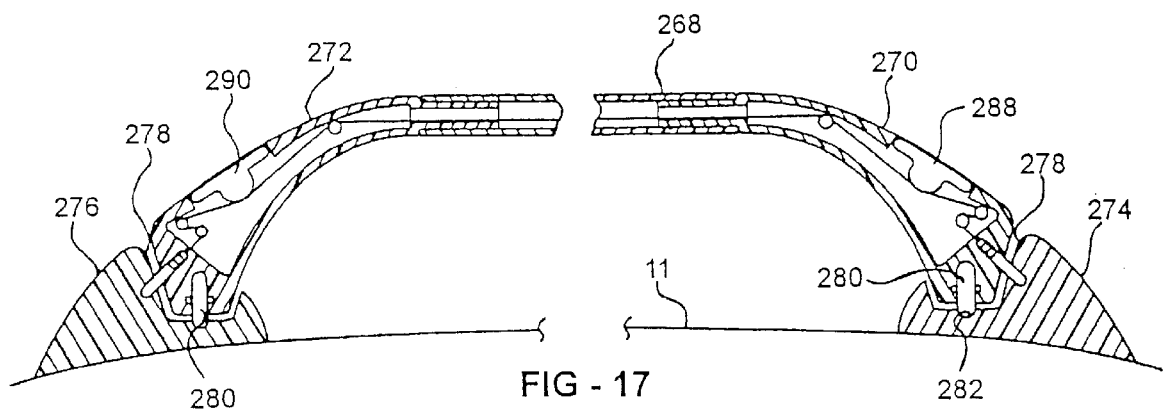
FIG. 17 is a lateral cross sectional view of the eighth embodiment shown in FIG. 16.
Figure 18:
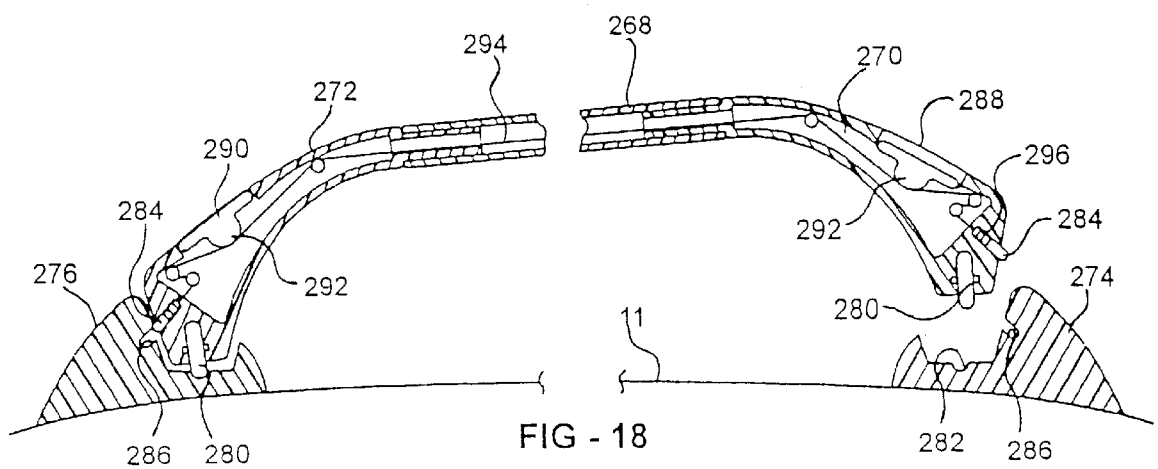
FIG. 18 is a view similar to FIG. 17; but showing the disengagement of one end of the cross rail from a side rail.

FIGS. 16–18 depict another embodiment of the present article carrier which may be pivoted about one end for movement longitudinally along the side rails or which can be completely removed from the side rails. In this embodiment, a cross rail 268 is slidably connected by a pair of stanchions 270 and 272 to a pair of laterally spaced side rails 274 and 276. Each of the side rails 274 and 276 has a generally open-ended slot 278 formed therein which opens upwardly through the top surface of each of the side rails 274 and 276. A roller 280 is rotatably mounted at the lower end of each of the stanchions 270 and 272 and engages a complimentarily formed, arcuate slot 282 formed in the interior opening 278 in each of the side rails 274 and 276 to control the sliding movement of the cross rail 268 along the side rails 274 and 276. A latch bar 284 in the form of a generally rectangular-shaped tab is mounted in and movably extends outward from one side edge of each of the stanchions, such as stanchion 270. The latch bar 284 releasably engages one of a plurality of longitudinally spaced, complimentarily shaped bores 286 formed in each of the side rails 274 and 276, respectively. An actuator means in the form of a pair of depressible push buttons 288 and 290 are respectively mounted in each of the stanchions 270 and 272. Each of the actuator members 288 and 290 is mounted in each respective stanchion 270 and 272 but is capable of a slight inward movement or depression under manual force. Each of the actuator members 288 and 290 has an interiorly disposed projection 292 which engages a continuous cable 294 extending between the latch bars 284 mounted in the stanchions 270 and 272. The latch bars 284 are normally biased outward by a biasing spring 296 seated within each stanchion 270 and 272. Depression of either of the actuator members or push buttons 288 or 290 causes a force to be exerted on the cable 294 which simultaneously retracts each of the latch bars 284 from the respective bores 286 in the side rails 274 and 276 to enable several different modes of movement of the cross rail 268.

In a first mode, as shown in FIG. 18, one end of the cross rail 268 may be pivoted about the opposite end, such as by raising the stanchion 270 out of engagement with the associated side rail 274 and pivoting the stanchion 272 about the roller 280 seated within the opposed side rail 276. While retaining the actuator member 288 or 290 in a depressed state, the cross rail 268 may be urged longitudinally along the side rails 274 and 276 to the desired position before the raised stanchion 270 is lowered into engagement with the side rail 274 and the actuator member 288 or 290 released to enable the latch bars 288 to be urged outward into engagement with one of the bores 286 in the side rails 274 and 276.

In a second mode of movement, the entire cross rail 268 may be disengaged from both side rails 274 and 276 in the same manner as described above for the disengagement of the stanchion 270 from the side rail 274 for storage or repositioning along the side rails 274 and 276. In a mounting operation, the cross bar 268 may be inserted into engagement with the side rails 274 and 276 by first depressing one of the actuators 288 and 290 to retract the latch bars 284 and then engaging the rollers 280 carried by each stanchion 270 and 272 in the respective groove 282 in the side rails 274 and 276 before releasing the actuator members 288 and 290 to cause extension of the latch bars 284 into one of the bores 286 in the side rails 274 and 276. It will be understood that either of the actuator members 190 or 232 described above may also be employed in place of the actuators 288 and 290.

Figure 19:
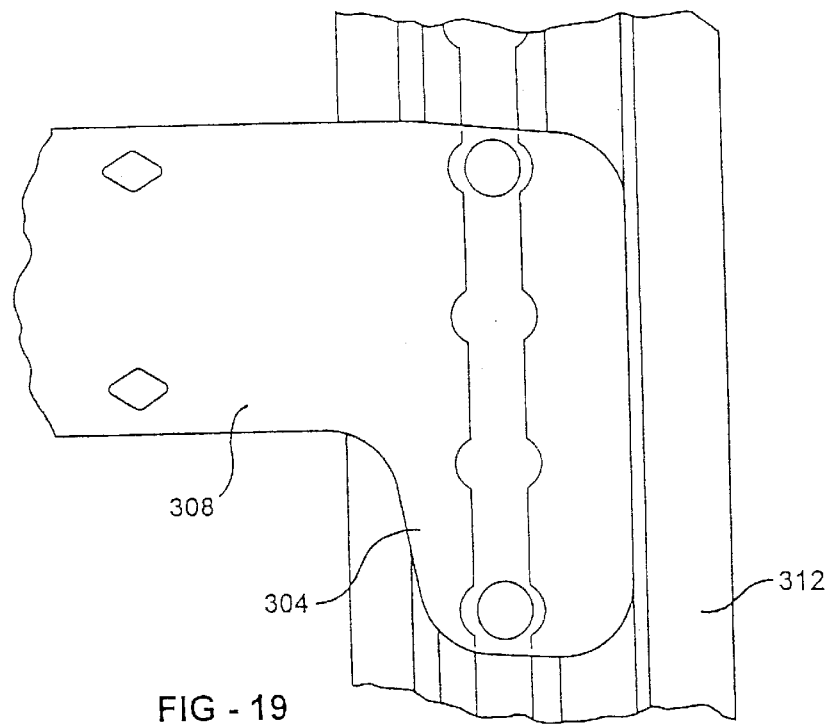
FIG. 19 is a partial, plan view of a ninth embodiment of the present invention.
Figure 20A:
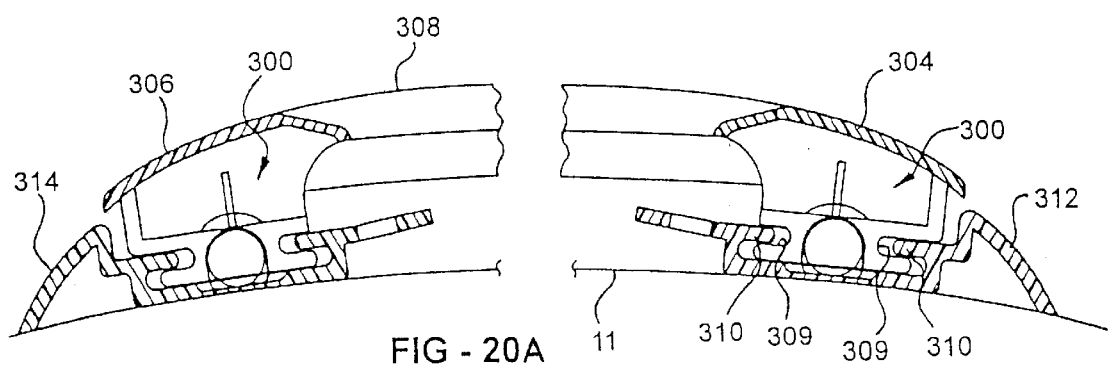
FIG. 20A is a lateral cross sectional view of the article carrier shown in FIG. 19.
Figure 21:
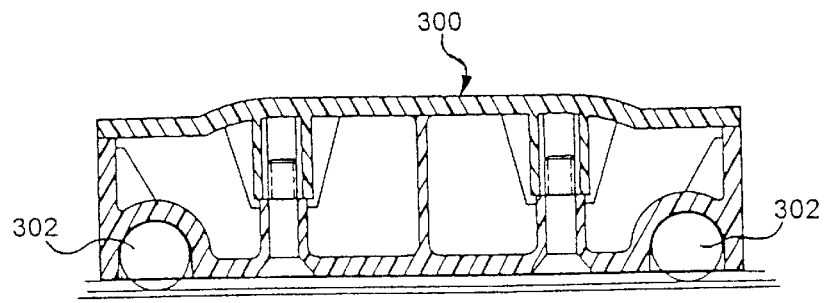
FIG. 21 is a side elevational view of one of the carriers used to attach a cross rail to the side rail of the article carrier shown in FIGS. 19 and 20.

FIGS. 19, 20 and 21 depict another embodiment of the article carrier of the present invention in which a carrier 300 having a pair of spaced spherical ball rollers 302 mounted therein is attached to each stanchion portion 304 and 306 formed at outer, opposite ends of a cross bar 308. Each of the carriers 300 includes a pair of inwardly extending recesses 309 which slidably receive inwardly facing flanges 310 formed on a raised portion of side rails 312 and 314. The recesses 309 in each carrier 300 are deeper than the length of the flanges 310 in the side rails 312 and 314 to allow a slight lateral movement of each carrier 300 and the attached stanchion portions 304 and 306 and the cross rail 308 within the side rails 312 and 314.

The latch means and biased pins described above and shown in FIGS. 1–3, 7 and 8 may be employed with the carriers 300 to provide a push/pull disengagement and re-engagement of one of the stanchions 304 and 306 with the side rails 312 and 314 to releasably position the cross rail 308 at any desired longitudinal position along the length of the side rails 312 and 314.

Each carrier 300 also includes opposed, lower, outwardly extending flanges 311 and 313 which slide within laterally, longer length, opposed recesses 315. Spring biased pins 317, similar to the pins 50 and springs 52 extending outwardly from the end members 42 in FIG. 3, are mounted on one flange 311 of each carrier 300 and seat against the inner wall of the mating recess 315 in the side rails 312 and 314 to bias each carrier 300 laterally to the right in the orientation shown in FIG. 20B. This lateral or rightward movement causes a latch pin 319 mounted on the opposed flange 313 of each carrier 300 to engage one of a plurality of spaced bores 321 formed along the length of the side rail 312 and 314 in the other recess 315. A pull movement to the left in the orientation of FIG. 20B or a push movement from the right side toward the left side causes the latch pins 319 to disengage from the respective bores 321 in the side rails 312 and 314 thereby enabling the carriers 300 to be moved to the left in the recesses 315 as shown in FIG. 20A allowing longitudinal repositioning of the carriers 300 and the attached crossbar 308.

Figure 20B:
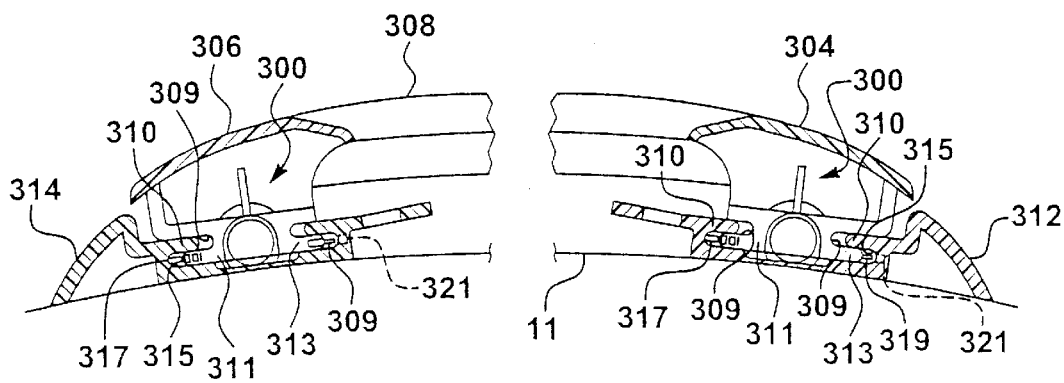
FIGS. 20B and 20C are partial cross-sectional views showing alternate latch and biasing means usable with the embodiment shown in FIG. 20A.
Figure 20C:
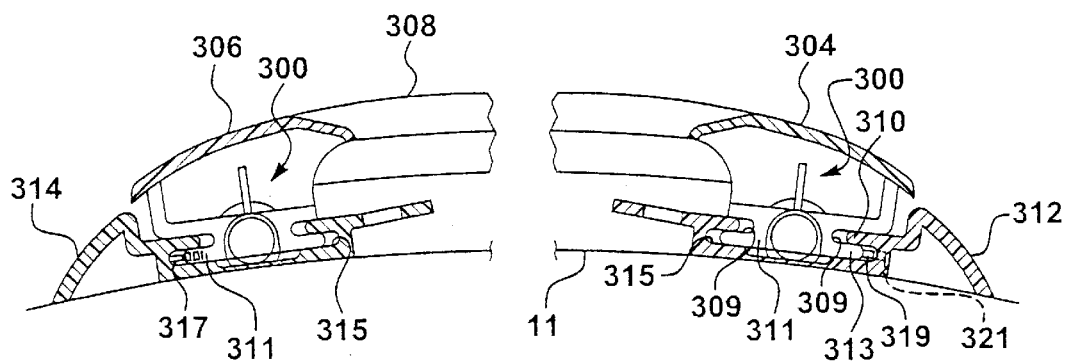

Similarly, the carriers 300 may also be provided with a biasing pin and latch pin according to the embodiment shown in FIG. 7 in the same manner as shown in FIG. 20B. In this aspect of the invention, the pin 319 corresponds to the latch pin 116 in FIG. 7. The spring biased pin 118 corresponds to the spring biased pin 319 in the same manner as described above for the embodiment shown in FIG. 20B. Operation of the carrier 300 is identical to the operation of the stanchion 110 and leg 112 in the embodiment shown in FIG. 7 insofar as allowing longitudinal repositioning of the carrier 300 and the attached crossbar after a pull movement on the crossbar from one side of the vehicle roof or a push movement from the other side.

The carriers 300 may also be provided with a latch pin and biasing pin in the same manner as the embodiment described above and shown in FIG. 8. The embodiment of FIG. 8 is similar to the embodiments of FIGS. 1–3 and 7 in that it relies on a spring biased pin seated between one of the side rails and a movable portion of the stanchion to bias the stanchion in one direction. A lateral force moving the stanchion in the opposite direction from the spring biasing force disengages a latch pin carried on a portion of the stanchion from one of a plurality of spaced bores in one of the side rails.

However, in the embodiment shown in FIG. 8, the spring biased pin 150 is mounted on one stanchion; while the latch pin, not shown in FIG. 8, is mounted on the opposite stanchion. These features can be applied to the carriers 300 by providing the spring biased pin 319 described above on one flange 311 to bias the leftmost carrier 300 to the right in the orientation shown in FIG. 20C. The latch pin 319, instead of being mounted on the flange 311 of the left carrier 300 as in FIG. 20B, is mounted on the flange 311 of the right carrier 300. Otherwise the operation of the carriers 300 and attached crossbar is identical to that described above and shown in FIG. 20A.

Figure 22:
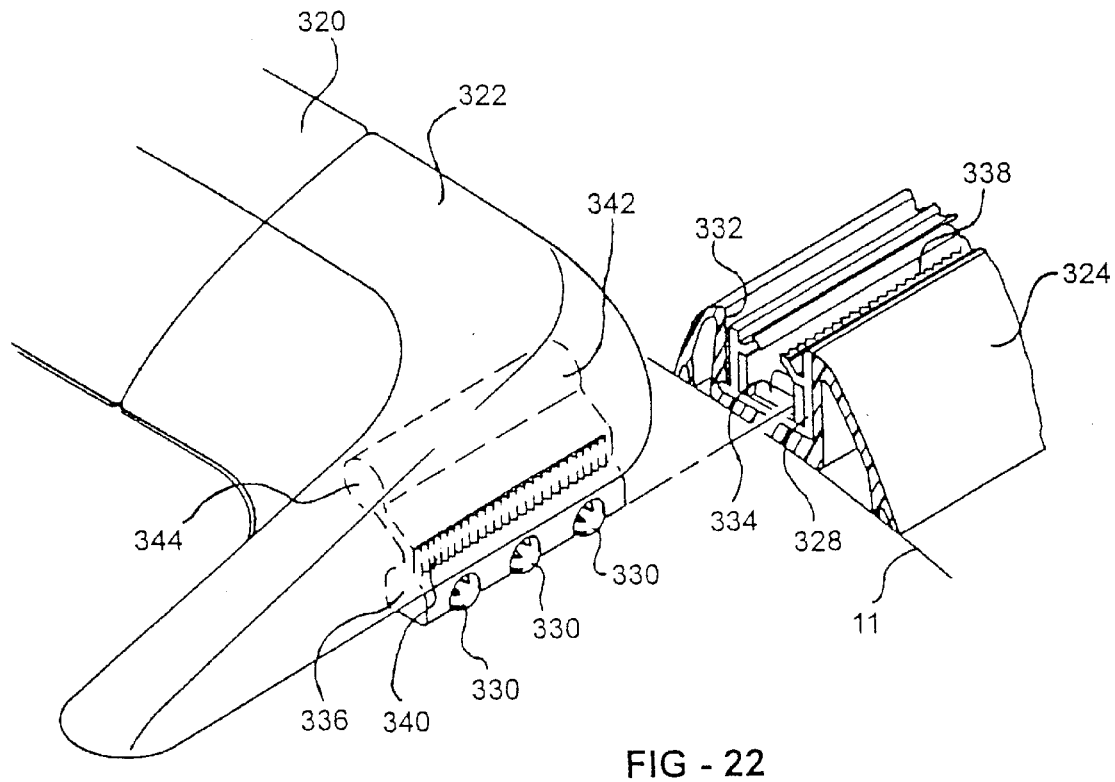
FIG. 22 is a partial, exploded, cross sectional, perspective view showing the mounting of a cross rail to a side rail in a tenth embodiment of the present invention.
Figure 23:
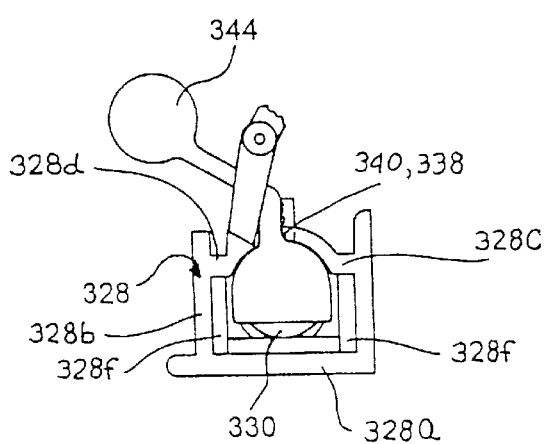
FIG. 23 is an end elevational view showing the carrier and ball roller arm depicted in FIG. 22.
Figure 24:
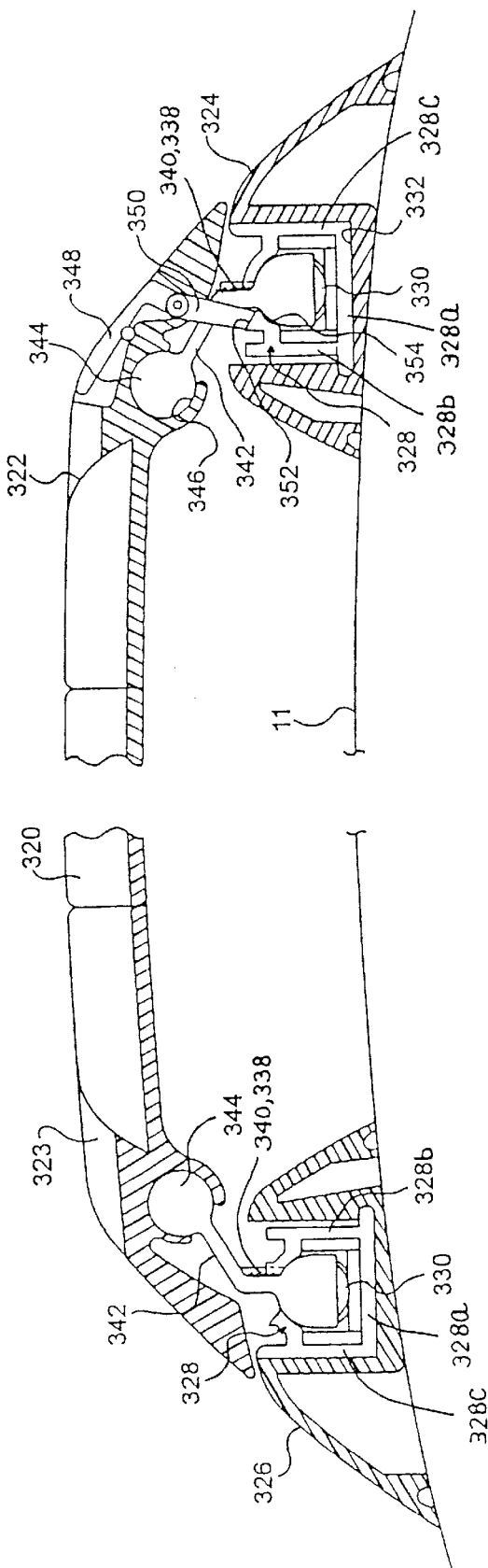
FIGS. 24 and 24A are lateral cross sectional views of the tenth embodiment shown in FIG. 22.

Another embodiment of the present article carrier is shown in FIGS. 22, 23 and 24. In this embodiment, a cross rail 320 is connected at opposite ends to a pair of stanchions 322 and 323. Alternately, the cross rail 320 and the stanchions 322 and 323 may be formed as an integral, one-piece member. The stanchions 322 and 323 are in turn slidably mounted in spaced, longitudinally extending side rails 324 and 326, respectively, which are fixedly mounted to a horizontally extending vehicle surface 11. A carrier 328 is fixedly disposed in an open-ended slot 322 formed in each of the side rails 324 and 326.

The carrier 328 which is mounted within the internal slot 332 in each side rail 324 and 326 has a toothed rack 334 formed along a bottom surface or wall 328a thereof which is adapted to be rollably engaged by one and preferably a plurality of toothed ball rollers or wheels 330 mounted in a housing 336 attached to each stanchion, such as stanchion 322. The carrier 328 also includes a pair of sidewalls 328b and 328c extending from the bottom wall 328a. Inward extending flanges 328d and 328e project from the sidewalls 328b and 328c, respectively. A strip 328f is disposed adjacent each sidewall 328b and 328c.

The latch means in this embodiment includes a first toothed latch rack 338 mounted on the flange 328e on the right side carrier 328 shown in FIGS. 22–24 and facing inwardly into the interior of the slot 332 in the side rail 324. The first toothed rack 338 on the left side carrier 328 faces in the same direction as the first rack 338 described above and as shown in FIG. 24. A second toothed rack 340 is mounted on the right side housing 336 and faces laterally outward so as to be releasably engagable with the first toothed latch rack 338. A second toothed rack 340 on the opposite left end housing 336, as shown in FIG. 24, faces laterally inward. The housing 336 includes a resilient central arm 342 which interconnects a lower portion of the housing 336 and a circular cross section upper portion 344 which is rotatably mounted in a recess 346 formed in the end of the stanchion 322.

Figure 24A:
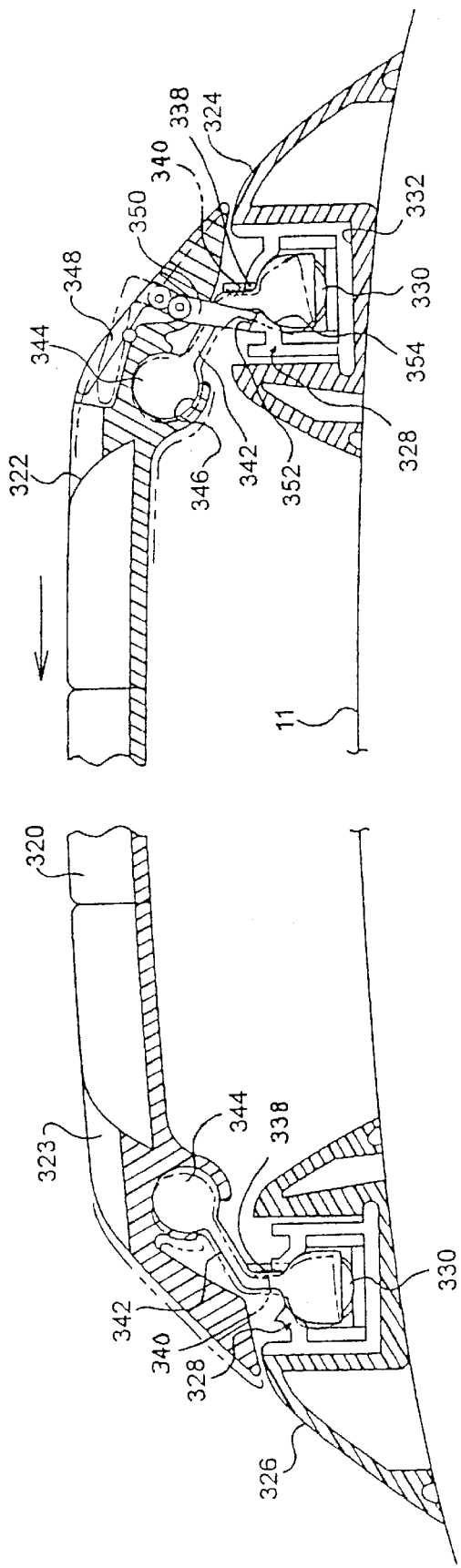

In this embodiment, the actuator means comprises a pivotal lever 348 mounted in one of the stanchions, such as stanchion 322 as shown in FIGS. 23, 24 and 24A. The actuator means 348 is omitted from FIG. 22 in order that the housing 336 may be more clearly shown. The lever 348 is pivotally connected to a wedge member 350, also mounted within the stanchion 322. The wedge member 350 has a lower inclined end face 352 which engages an angularly disposed face 354 formed on the carrier 328.

When the actuator 348 is in a normal position in which the cross rail 320 is fixed or latched in a stationary position between the side rails 324 and 326, the inclined face 352 of the wedge member 350 will engage the angular face 354 on the carrier 328 and pivot outward to engage the housing 336 and to urge the housing 336 laterally outward or to the right in the orientation shown in FIG. 24 locking the first and second toothed latch racks 338 and 340 into engagement and locking the cross rail 320 in a fixed position between the side rails 324 and 326. Depression of the actuator member 348 will cause an upward movement of the wedge member 350 thereby releasing the pushing force previously exerted on the housing 336 by the wedge member. A manual push force exerted on the stanchion 322 to the left in the orientation shown in FIG. 24A causes rotation of the housing 336 about a longitudinal axis extending through the lower portion of the housing 336 in the carrier 328 and disengagement of the second toothed rack 340 from the first toothed rack 338. This left directed sideways movement will also rotate the resilient arm 342 and cause a sideways movement of the stanchion 322, the cross rail 320 and the opposed stanchion 323 in the same leftward direction. This sideways force will be transmitted through rotation of the corresponding circular cross section member 344 mounted in the stanchion 323 and cause rotation of the resilient arm 342 connected thereto. This will rotate the housing 336 mounted in the carrier 328 in the side rail 326 thereby disengaging the first and second toothed latch racks 338 and 340 associated therewith and permitting a simultaneous longitudinal movement of the cross rail 320 along the side rails 324 and 326. Reverse movement of the actuator 348 will bring the inclined face 352 of the wedge member 350 into sliding engagement with the angular face 354 on the carrier 328 and rotate the housing 336 clockwise thereby locking the first and second toothed latch racks 338 and 340 in engagement. This clockwise rotation also locks the opposed housing 336 via its interconnected first and second toothed latch racks 338 and 340.

Figure 25:
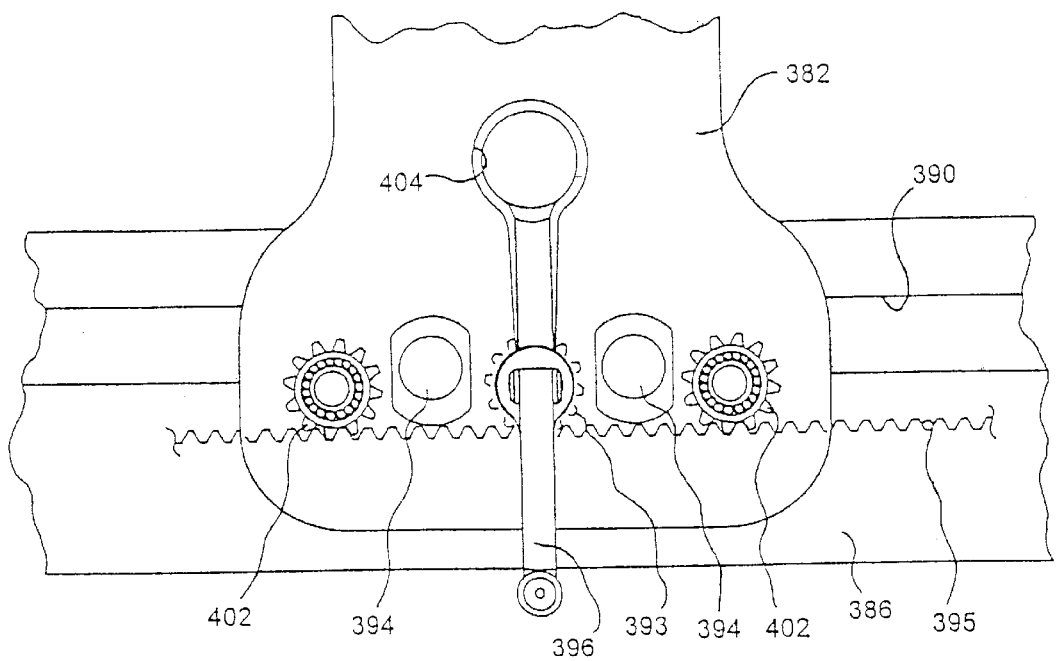
FIG. 25 is a partial plan view showing an eleventh embodiment of the present invention.
Figure 26:
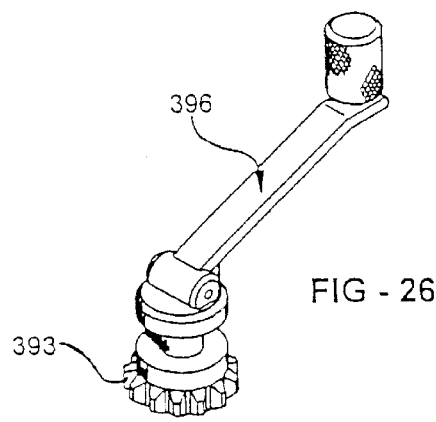
FIG. 26 is a perspective view of the handle and drive gear shown in FIG. 25.
Figure 27:
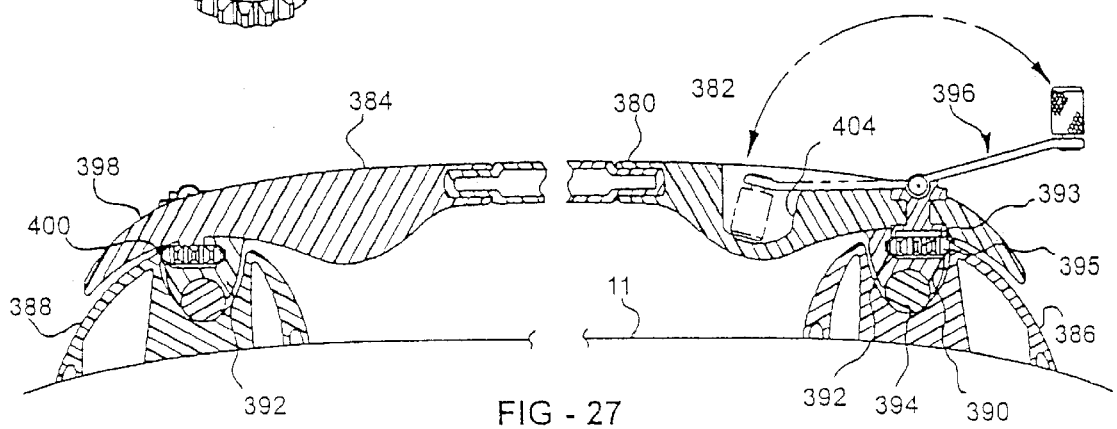
FIG. 27 is a lateral cross sectional view of the eleventh embodiment shown in FIG. 25.

Another embodiment of the article carrier of the present invention is shown in FIGS. 25–27 in which a cross rail 380 is connected at opposite ends to a pair of stanchions 382 and 384. The stanchions 382 and 384 are slidably mounted in a pair of laterally spaced side rails 386 and 388. Each of the side rails, such as side rail 386, includes a generally concave, open-ended cavity 390 formed therein and opening outward through the top surface of the side rail 386. A carrier 392 is fixedly mounted to each stanchion 382 and 384 and has at least one and preferably a plurality of ball rollers 394 mounted therein which rollably engage the bottom surface of the cavity 390 formed in the side rail 386 or 388.

In this embodiment, the latch means comprises a rotatable gear 393 mounted within each carrier 390. The rotatable gear 393 meshingly engages a gear rack 395 formed on an inner facing edge of the cavity 390 in each side rail 386 and 388. An actuator in the form of a rotatable handle 396 is connected to the gear 393 through the stanchion 382 for rotating the drive gear 393 and moving the cross rail 380 along the side rails 386 and 388. A corresponding rotatable gear 398 is mounted in the opposed stanchion 384 and meshingly engages a similarly formed rack 400 formed in the opposed side rail 388.

Rotation of the handle 396 causes rotation of the drive gear 393 and movement of the stanchion 382, the cross rail 380 and the opposed stanchion 384 along the side rails 386 and 388. The driving force exerted by rotation of the handle 396, the drive gear 393 and the toothed rack 394 in the side rail 386 is transmitted by the cross rail 380 and the stanchions 382 and 384 through the opposite drive gear 394 and rack 400 in the opposite side rail 388 to maintain the cross rail 380 substantially perpendicular to the side rails 386 and 388 during any longitudinal movement therealong.

Also, in this embodiment, at least one and preferably a pair of spaced guide gears 402 are also mounted in each stanchion, such as stanchion 382 and engage the rack 395, to aid in guiding the stanchion 382 along the side rail 386. Further, a recess 404 is preferably formed in the stanchion 382 and extends inward from the top surface thereof. The recess 404 receives the handle 396 which is pivotally connected to the drive gear 393. The handle 396 is thus pivotal between an outer, operative, gear rotating position shown in solid in FIG. 27 to a storage position shown in phantom in FIG. 27 in which the handle 396 is completely contained within the recess 404 below the top surface of the stanchion 384.

In summary, there has been disclosed a unique article carrier for vehicles which includes at least one cross rail movably mounted between a pair of longitudinally extending side rails. The cross rail is uniquely mounted to the side rails via latch and actuator means which all enable the cross rail to be moved to any selected position along the length of the side rails by a single individual only from one side of the vehicle. The article carrier also enables the cross rail to be adjusted by a single individual from either side of the vehicle without requiring the individual to circle the vehicle several times to unlatch, move and re-latch the cross rail in the desired position. The article carrier of the present invention also insures that the cross rail moves in a substantial parallel fashion along the side rails during any repositioning thereof.

What is claimed is:

1. An article carrier for a vehicle having a generally horizontally extending exterior body surface, the article carrier comprising:

a pair of spaced side rails mounted on the exterior body surface and extending longitudinally along the vehicle, each side rail having a longitudinally extending interior cavity formed therein of a predetermined cross section, the interior cavity opening exteriorly through the side rail;

a cross rail extending laterally between the pair of side rails;

a pair of stanchions, each extending from opposite ends of the cross rail and slidably engagable with the longitudinal interior cavity in the side rails through the opening therein;

latch means, disengagingly coupled between each stanchion and each side rail, for selectively and adjustably latching each stanchion to each side rail in one of a plurality of spaced positions along the length of each side rail; and biasing means, coupled between each of the stanchions and the side rails, for simultaneously normally moving the cross rail, the pair of stanchions and each latch means in a first transverse direction to a latch position in which the latch means fixedly engages each side rail, and wherein a manual lateral force on one of the cross rail and the stanchions in a second transverse direction opposite from the first direction overcomes the biasing force of the biasing means and moves the latch means to an unlatch position in which the latch means is disengaged from each side rail to permit longitudinal movement of the cross rail with respect to the pair of side rails.

2. The article carrier of claim 1 wherein:

each stanchion comprises an integral, one-piece extension of the cross rail.

3. The article carrier of claim 1 wherein the latch means comprises:

a plurality of longitudinally spaced, co-linear apertures formed in each side rail;

a latch pin mounted on and extending outward from each stanchion; and the biasing means simultaneously moving the latch pin on each stanchion into and out of engagement with one of the apertures in each side rail.

4. An article carrier for a vehicle having a generally horizontally extending exterior body surface, the article carrier comprising:

a pair of spaced side rails mounted on the exterior body surface and extending longitudinally along the vehicle, each side rail having a longitudinally extending interior cavity formed therein of a predetermined cross section, the interior cavity opening exteriorly through the side rail;

a cross rail extending laterally between the pair of side rails:

a pair of stanchions, each extending from opposite ends of the cross rail and slidably engagable with the longitudinal interior cavity in the side rails through the opening therein:

latch means, disengagingly coupled between each stanchion and each side rail, for selectively and adjustably latching each stanchion to each side rail in one of a plurality of spaced positions along the length of each side rail, the latch means including:

a plurality of longitudinally spaced, co-linear apertures formed in each side rail; and a latch pin mounted on and extending outward from each stanchion;

slider means, mounted on each stanchion, for slidably engaging and longitudinally movable along an inner surface in the longitudinal interior cavity in each side rail;

the interior cavity in each side rail having a cross section larger than the cross section of the slider means to permit lateral movement of the slider means within the interior cavity; and biasing means, for biasing each stanchion and the cross rail extending therebetween in a first normal lateral direction simultaneously bringing each latch pin into engagement with one of the apertures in each side rail, and allowing the cross rail and each stanchion to be manually urged in an opposite direction, overcoming the force of the biasing means, to disengage each latch pin from an aperture in each side rail to permit longitudinal movement of the cross rail with respect to the pair of side rails.

5. The article carrier of claim 4 wherein the slider means comprises:

at least one roller mounted on an end of each stanchion and slidably engaging an inner surface in the longitudinal interior cavity in a side rail; and the latch pin and the biasing means mounted on the end of the stanchion and extending outward from the roller.

6. The article carrier of claim 4 wherein the slider means comprises:

a carrier; and at least one roller rotatably mounted on the carrier and slidably engaging an inner surface in the longitudinal interior cavity in a side rail.

\* \* \* \* \*